United States Patent
Chatrenet et al.

(12)

(10) Patent No.: US 6,643,568 B2
(45) Date of Patent: Nov. 4, 2003

(54) SYSTEM FOR AUTOMATICALLY CONTROLLING LIFT-AUGMENTATION DEVICES OF AN AIRCRAFT DURING TAKE-OFF

(75) Inventors: Dominique Chatrenet, Cornebarrieu (FR); Gérard Mathieu, Pibrac (FR); Fernando Alonso, Toulouse (FR); Martine Cart-Lamy, Toulouse (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 09/988,264

(22) Filed: Nov. 19, 2001

(65) Prior Publication Data

US 2002/0099479 A1 Jul. 25, 2002

(30) Foreign Application Priority Data

Dec. 6, 2000 (FR) .............................. 00 15801

(51) Int. Cl.$^7$ .............................................. G06F 19/00
(52) U.S. Cl. ........................... 701/15; 701/16; 244/178; 244/182
(58) Field of Search ..................... 701/15, 16; 244/178, 244/182, 188; 73/178 T; 318/581; 340/959, 960

(56) References Cited

U.S. PATENT DOCUMENTS

| | | | |
|---|---|---|---|
| 3,945,590 A | 3/1976 | Kennedy, Jr. et al. ...... | 244/181 |
| 4,042,197 A | 8/1977 | Boyle et al. ................ | 244/183 |
| 4,259,658 A * | 3/1981 | Basov et al. ............... | 340/951 |
| 4,277,041 A * | 7/1981 | Marrs et al. ................ | 244/182 |
| 5,519,391 A | 5/1996 | Paterson et al. ............ | 340/959 |

FOREIGN PATENT DOCUMENTS

| | | |
|---|---|---|
| EP | 0273410 | 7/1988 |
| EP | 0337581 | 4/1991 |
| FR | 2425380 | 12/1976 |

\* cited by examiner

Primary Examiner—Marthe Y. Marc-Coleman
(74) Attorney, Agent, or Firm—Stevens, Davis, Miller & Mosher, LLP

(57) ABSTRACT

A system for automatically controlling lift augmentation devices of an aircraft, during a phase of take-off by the aircraft, includes a controllable actuator that shifts the lift-augmentation devices, and a control unit for generating control demands to control the actuator to bring the lift-augmentation devices into a defined position. The control unit further includes a detector that detects actual take-off by the air craft and, if appropriate, signals such detection to the control unit. At start of the take-off phase, the lift-augmentation device are brought into a first position, in which they are deployed. The control unit generates, at least when the detector signals the actual take-off, a control demand making it possible to bring the lift-augmentation devices into a second position, in which the lift-augmentation devices are retracted by comparison with the first position.

10 Claims, 4 Drawing Sheets

SYSTEM FOR AUTOMATICALLY CONTROLLING LIFT-AUGMENTATION DEVICES OF AN AIRCRAFT DURING TAKE-OFF

BACKGROUND OF THE INVENTION

1. Field of the Invention

The present invention relates to a system for automatically controlling lift-augmentation devices of an aircraft during take-off.

2. Description of Related Art

It is known that, particularly for the sake of profitability, the airline companies seek to increase as far as possible the occupancy level of their airplanes, which, needless to say, has the consequence of increasing the mass of these airplanes. However, at certain airports, the landing and take-off runways may prove to be of insufficient length to allow airplanes exhibiting a very high mass to take off.

Thus the airplane manufacturers seek to reduce the runway length necessary for take-off, whatever the type and/or the mass of the airplane in question.

To that end, in order to enhance the performance on take-off, the wings of the airplane, especially of civil transport airplanes, are generally equipped with lift-augmentation devices (slats on the leading edge of the wing and flaps at the trailing edge) which can be deployed and retracted, which make it possible to augment substantially the lift generated at given incidence, when they are deployed, and also to push back the phenomenon of stalling. This augmentation in the lift has the consequence of reducing the flying speeds and, thus, of reducing the length of runway necessary for take-off.

Consequently, it is advantageous, during take-off, to deploy these lift-augmentation devices as much as possible in order to augment the lift and thus reduce the length of runway necessary for take-off.

However, the deployment of the lift-augmentation devices, while augmenting the lift, also augments the drag. This is because the profile of the wings is modified by the presence of these devices, which degrades its aerodynamic behavior as regards drag: its profile departs from the "clean wing" profile. This then entails a degradation in the angle of climb.

However, this angle of climb of the aircraft (when the latter has left the ground) has to comply with regulatory constraints. This is because aeronautical regulations stipulate a minimum angle of climb, with one engine assumed to have failed, this being done in order to ensure that an airplane, one of the engines of which has inadvertently failed, can complete its take-off under good safety conditions.

Consequently, in order to preserve a minimum angle of climb allowing take-off in complete safety, it is advantageous to deploy the lift-augmentation devices as little as possible in order to reduce the corresponding drag as much as possible.

It emerges clearly from the foregoing that the choice of the configuration of the lift-augmentation devices for the take-off phase results from a compromise between the runway length (favorable to extraction or deployment of the lift-augmentation devices) and the angle of climb (favorable to the retraction of said lift-augmentation devices). This choice, which is made by the pilot of the aircraft, is made on the basis of the take-off conditions (available runway length, altitude, temperature, mass of the airplane, presence of an obstacle, etc.). Once the pilot has made his choice, he configures the lift-augmentation devices by the use of a control lever into the configuration corresponding to this choice. The configuration thus chosen is kept throughout the entire take-off phase since, in the current state of aeronautical regulations, it is forbidden for the pilot to alter this configuration throughout the entire take-off phase, so as to allow him to concentrate exclusively on monitoring his trajectory and his flight parameters.

Consequently, in the current state of the regulations and of the technology, the choice of the position or configuration of the lift-augmentation devices results from a compromise between two contradictory requirements, which is made before the take-off phase and which is therefore not optimal.

Systems are known making it possible to improve the position of said lift-augmentation devices.

However, these known systems apply, in general, only in response to a disturbance (failure of an engine or gusts of wind especially) which alters the flight conditions of the airplane. Thus, by way of illustration, the document FR-2 425 380 describes a control system which, when an engine fails, acts automatically on the control surfaces so as to configure the airplane aerodynamically in such a way as to compensate for the effect of the loss of thrust on the aerodynamic characteristics of the wing. Moreover, the document EP-0 337 581 discloses a system which, in the event of gusts of wind during the approach phase, compensates for the loss of altitude and the pitch generated by the gusts, by increasing the speed of the airplane by increasing the thrust from the engines, taking account, particularly, of the position of the flaps.

Furthermore, the document U.S. Pat. No. 4,042,197 describes a device which is for the purpose, in the take-off and approach phases, of optimizing the position of the lift-augmentation flaps, as well as the thrust, in such a way as to reduce substantially the noise generated by this equipment. As far as the take-off phase is concerned, information on speed and on the raising of the landing gear (landing gear fully raised) are used to set the position of the lift-augmentation flaps. This information is compared with reference information (speed, distance since releasing the brakes, final position of the flaps) input by the pilot on a control panel. Simultaneously, this known device indicates to the pilot the instant when a regulatory distance since releasing the brakes has been reached, instructing him then to reduce the thrust from the engines (and therefore the noise resulting therefrom).

This known device therefore requires manual action by the pilots who has to input various values (speed, distance, altitude) into the control panel, with the risks of error which that may carry with it.

Furthermore, especially, the change of position of the lift-augmentation flaps is ordered and performed only when the landing gear has been fully raised, that is to say toward the end of the take-off phase.

SUMMARY OF THE INVENTION

The object of the present invention is to remedy these drawbacks. The invention relates to a system for control of lift-augmentation devices of an aircraft, making it possible automatically to optimize the position thereof during the phase of take-off by the aircraft.

To that end, said system of the type including:

controllable actuating means for shifting said lift-augmentation devices; and a control unit suitable for generating control demands, in order to control said actuating means in such a way that the latter bring said lift-augmentation devices into a defined position, is noteworthy in that it further includes a first means for detecting the actual take-off by the aircraft and, if appropriate, for signaling such detection to the control unit, and in that, at the start of the take-off phase, said lift-augmentation devices are brought into a first position, in which they are deployed, and in that said control unit is formed in such a way as, at least when said first means signals the actual take-off, to generate a control demand making it possible to bring said lift-augmentation devices into a second position, in which they are retracted by comparison with said first position.

Thus, by virtue of the invention, during the take-off phase:

- as long as the aircraft is rolling over the ground, the lift-augmentation devices (slats and/or flaps) are deployed in such a way as to augment the lift of the aircraft, which has the consequence of reducing the flight speeds and thus of reducing the runway length necessary for the take-off. Consequently, for a given type of aircraft, especially a civil transport airplane, which is equipped with the control system in accordance with the invention, it is possible either to increase its mass or to use a shorter take-off runway, by comparison with an aircraft of the same type not equipped with said control system; and
- when the actual take-off has been achieved, that is to say when the wheels of the aircraft leave the ground, the lift-augmentation devices are brought into a less deployed position (that is to say with lift less augmented) in such a way as to reduce the drag, which then makes it possible to obtain a minimum angle of climb (with one failed engine) allowing a take-off in complete safety.

Furthermore, the control of the lift-augmentation devices is carried out automatically, without any intervention by the pilot of the aircraft, which allows the latter to concentrate exclusively on piloting, as the abovementioned aeronautical regulations require.

It will moreover be noted, in contrast to the control device disclosed by the abovementioned document U.S. Pat. No. 4,042,197, that the change of position (or of configuration), in accordance with the invention, of the lift-augmentation devices is not ordered toward the end of the take-off phase, but as soon as the aircraft leaves the ground, so as to reduce the drag immediately in order to optimize the minimum angle of climb and thus to achieve take-off in complete safety. Safety is not assured if the change of position is carried out toward the end of the take-off phase, as this known control device provides. Moreover, in the context of the present invention, the condition of "actual take-off" is the only essential condition (necessary and sufficient condition) for ordering the change of position, while the abovementioned known document still requires the speed of the aircraft to be taken into account.

According to the invention, said control system can be activated and de-activated by an operator of the aircraft, for example a pilot.

Moreover, advantageously, said first means detects a landing-gear-unloaded indication, in order to determine the instant when the aircraft actually takes off.

Furthermore, advantageously, for reasons of safety (stall limits), the control system in accordance with the invention further includes a first safety device which comprises:

means for determining the actual speed of the aircraft;

means for selecting a first minimum datum speed of the aircraft, for said second position of the lift-augmentation devices; and means for comparing said actual speed with said first minimum datum speed, and said first safety device is associated with said control unit in such a way that the latter generates a control demand making it possible to bring the lift-augmentation devices into said second position only when said actual speed is greater than said first minimum datum speed.

According to the invention, said second position (retracted) of the lift-augmentation devices, especially depending on the configurations (or positions) which are available for the lift-augmentation devices, may be:

- in a first embodiment, the position of the lift-augmentation devices for cruising flight of the aircraft; and
- in a second embodiment, an intermediate position between said first position and a third position, in which the lift-augmentation devices are further retracted than in said second position.

In this second embodiment, the control system in accordance with the invention further advantageously includes a second means for detecting the start of the raising of at least one landing gear of the aircraft and, if appropriate, for signaling such a detection to the control unit, and said control unit is formed in such a way as to generate a control demand making it possible to bring said lift-augmentation devices from said second position to said third position, at least when said second means signals the start of the raising of the landing gear.

Furthermore, in this second embodiment, for reasons of safety or simply for the purposes of control, said control system further advantageously includes a second safety device which comprises:

means for determining the actual speed of the aircraft;

means for selecting a second minimum datum speed of the aircraft, for said third position of the lift-augmentation devices; and means for comparing said actual speed with said second minimum datum speed, and said second safety device is associated with said control unit in such a way that the latter generates a control demand making it possible to bring the lift-augmentation devices into said third position only when said actual speed is greater than said second minimum datum speed.

Moreover, advantageously, said control system further includes a third means for determining whether a hydraulic flow rate which is sufficient to bring the lift-augmentation devices from the second position to the third position is available, and said control unit generates a control demand in order to bring said lift-augmentation devices from said second position to said third position only when a sufficient hydraulic flow rate is available.

Furthermore, advantageously, the control system in accordance with the invention may further include a means for verifying whether the second position is the most retracted position (or not), that is to say to verify whether it is possible to bring the lift-augmentation devices into a third position.

BRIEF DESCRIPTION OF THE DRAWINGS

The figures of the attached drawing will give a good understanding of how the invention can be produced. In these figures, identical references designate similar elements.

DETAILED DESCRIPTION OF THE INVENTION

Figure 1:
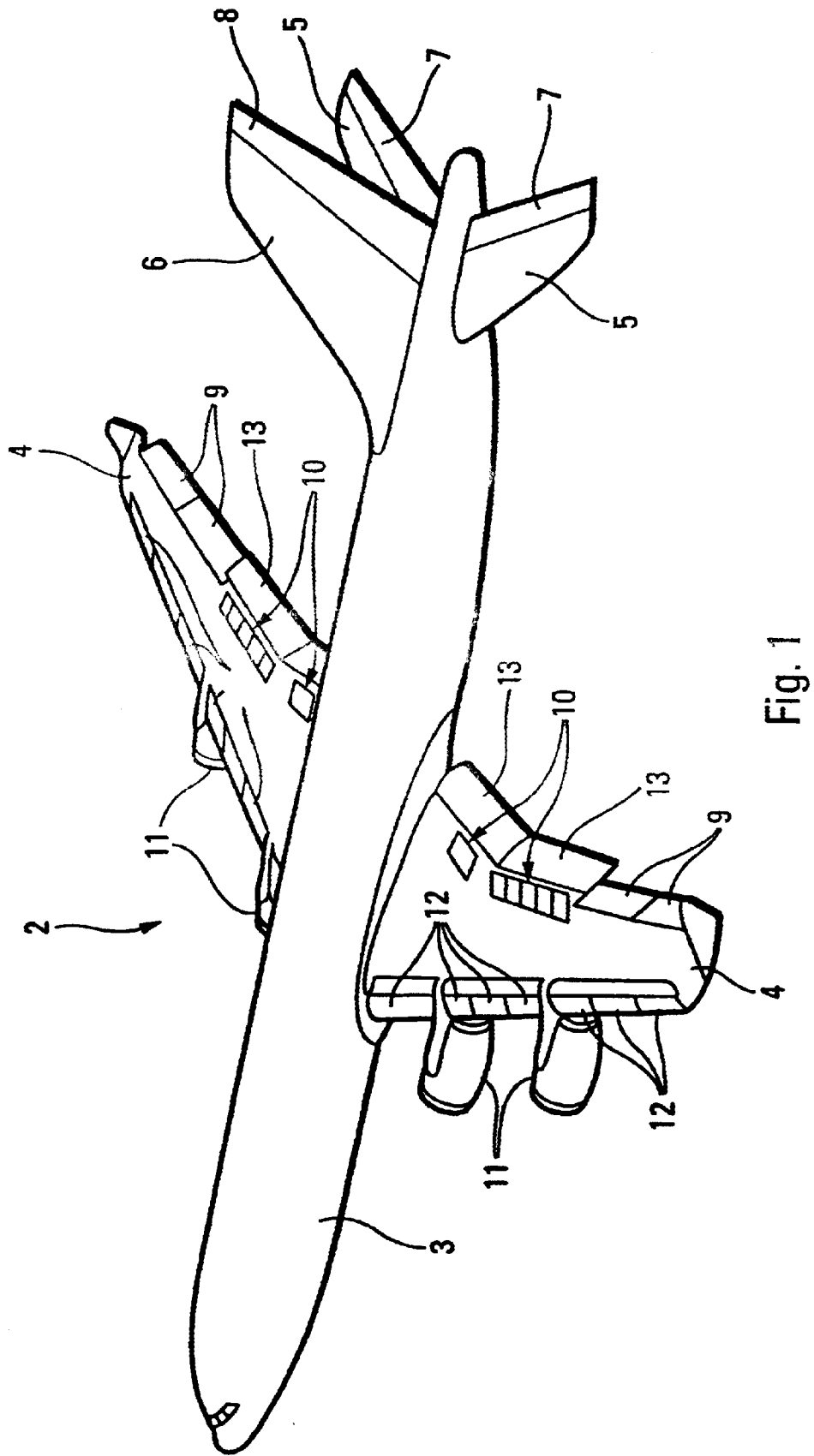
FIG. 1 shows a civil transport airplane, to which a control system in accordance with the invention is applied.
Figure 2:
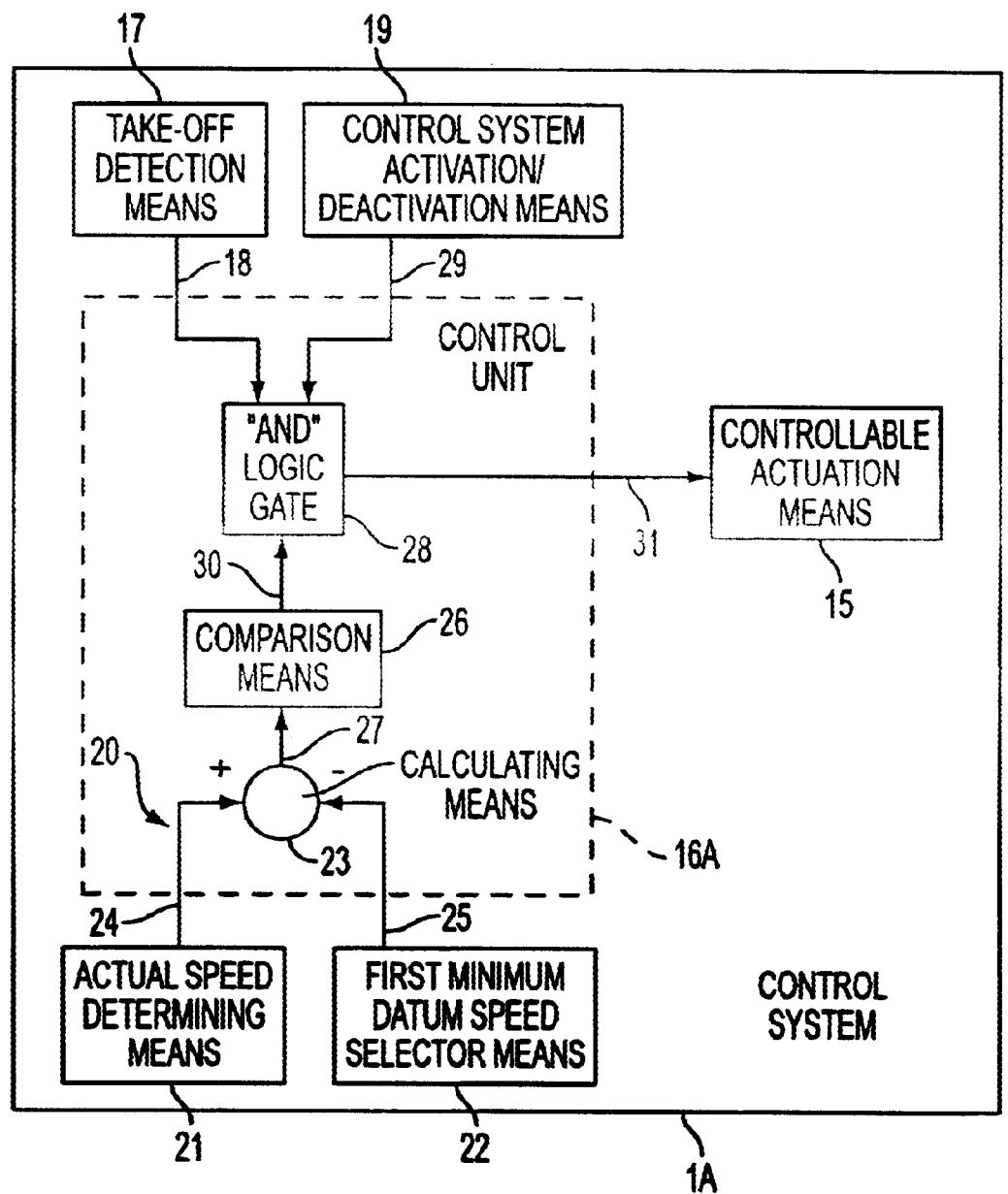
FIGS. 2 and 3 diagrammatically illustrate control systems in accordance with the invention, produced respectively according to two different embodiments.
Figure 3:
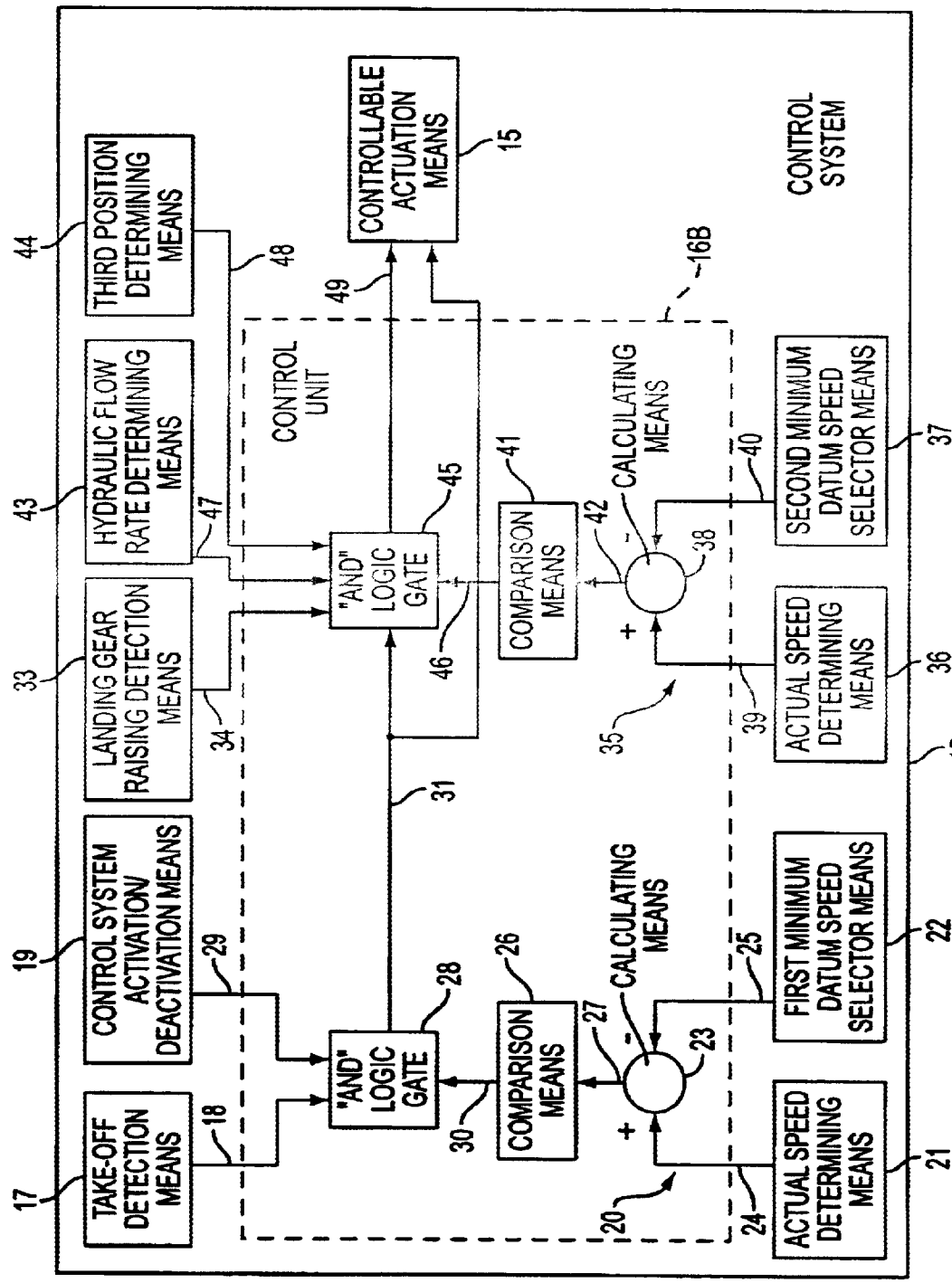

The control system in accordance with the invention and represented diagrammatically according to two different embodiments 1A and 1B, respectively in FIGS. 2 and 3, is applied to an aircraft 2, in particular a civil transport airplane, as represented in FIG. 1.

This transport airplane 2 includes a fuselage 3 to which are connected, among other things, two wings 4 forming the mainplane, a horizontal rear empennage formed by two stabilizer planes 5 and a fin 6. Each of said stabilizer planes 5 is provided with an elevator 7, and the fin 6 is provided with a rudder 8. Moreover, each of the wings 4 especially includes, in the usual way, ailerons 9, spoilers 10 and two propulsion engines 11.

In order to enhance the performance of the airplane 2 on take-off, each of said wings 4 is moreover provided with the usual lift-augmentation devices, namely slats 12 on the leading edge of the wing 4 and flaps 13 at the trailing edge, which are capable of being brought into different positions or configurations specified below, these lift-augmentation devices making it possible to increase the lift of said aircraft 2.

By way of example, each wing of an airplane of the AIRBUS A340 type is equipped with seven slats 12 and two flaps 13.

The control system 1A, 1B in accordance with the invention is intended to control said lift-augmentation devices 12 and 13 automatically during the phase of take-off by the airplane 2.

To that end, this control system 1A, 1B includes:
  normal, controllable actuation means 15, for shifting the lift-augmentation devices 12 and 13 so as to bring them into one of the different possible positions or configurations; and
  a control unit 16A, 16B, which is capable of generating control demands automatically for controlling said actuation means 15.

According to the invention:
  said control system 1A, 1B further includes a means 17 specified below, which is linked by a link 18 to the control unit 16A, 16B, and which is intended to detect the "actual take-off" by the airplane 2; and
  said control unit 16A, 16B is formed in such a way as, at least when said means 17 signals to it the actual take-off by the airplane 2, to generate a control demand making it possible to bring said lift-augmentation devices 12 and 13 from a first deployed position at the start of the take-off phase into a second position, in which they are retracted by comparison with this first position.

In the context of the present invention, "actual take-off" by the airplane 2 is understood to be the moment when the last wheels of the landing gear of aid airplane 2 actually leave the ground of the take-off runway. In order to be able to determine this moment precisely, the means 17 is preferably formed in such a way as to determine the moment when the landing gear is unloaded. However, it can also be envisaged that this means 17 might monitor one or more other parameters in order to detect the actual take-off.

Thus, by virtue of the invention, during the take-off phase:
  as long as the airplane 2 is rolling along the ground S, the lift-augmentation devices 12 and 13 are deployed in such a way as to augment the lift, which, as is known, has the consequence of reducing the take-off speed and hence of reducing the runway length necessary for take-off. This means that, for a given type of airplane 2, especially a civil transport airplane, which is equipped with the control system 1A, 1B in accordance with the invention, it is possible either to increase its mass, or to use a shorter take-off runway, by comparison with the same type of airplane not equipped with such a control system; and
  when the actual take-off takes place, that is to say when the wheels of the airplane 2 leave the ground, the lift-augmentation devices 12 and 13 are brought into a less deployed position (that is to say less lift-augmented) in such a way as to reduce the drag which, as is known, then makes it possible to obtain a minimum climb angle (with one engine failed) allowing take-off in complete safety.

As can be seen in FIG. 2, the control system 1A further includes:
  a usual means 19, which allows the pilot or another operator of the airplane 2 to activate or deactivate said control system 1A manually, especially before take-off; and
  a safety device 20 which comprises:
    usual means 21 for determining the actual speed of the airplane 2;
    usual means 22 for selecting a first minimum datum speed of the airplane 2 for said second position of the lift-augmentation devices 12 and 13; and
    means for comparing said actual speed with said first minimum datum speed, these latter means comprising, for example:
      calculating means 23 linked by links 24 and 25 respectively to said means 21 and 22, for calculating the difference between said actual speed and said first minimum datum speed; and
      a comparison means 26 linked by a link 27 to the calculating means 23, for comparing this difference with the zero value.

The control unit 16A includes a normal AND logic gate (gate 28) which is linked, by way of links 18, 29 and 30, to said means 17, 19 and 26 respectively.

Thus, the control unit 16A sends a control demand to the actuating means 15, as illustrated by a link 31, when the information output by said means 17, 19 and 26 is all favorable to the sending of such a control demand, that is to say:

a) when the actual take-off has taken place (means 17); and, furthermore b) when the system 1A is activated (means 19); and c) that the airplane 2 is flying at a speed (actual speed) which is greater than said first minimum datum speed (means 26).

Needless to say, the abovementioned condition a) is essential to the implementation of the present invention, while conditions b) and c) represent improvements of said control system 1A. In particular, condition c) represents a measure of safety (stalling limits).

Although, for implementing the present invention, it is sufficient for the second position of the lift-augmentation devices 12 and 13 to be such that said lift-augmentation devices 12 and 13 are simply more retracted (or less deployed) than in the first position, for preference:

said first position is the most deployed position possible, in order to obtain the highest lift; and said second position is the usual position of said lift-augmentation devices 12 and 13 in the phase of flight which follows the take-off phase. Such an implementation can be achieved by the embodiment 1A of FIG. 2.

However, said second position can also be an intermediate position between said first position and a third position, in which the lift-augmentation devices 12 and 13 are even further retracted than in said second position, said third position possibly corresponding, in this case, to said abovementioned usual position of the phase of flight following the take-off phase.

The embodiment 1B of the control system represented in FIG. 3 makes it possible to achieve such an implementation (with a third position).

To that end, as can be seen in FIG. 3, said embodiment 1B, in addition to the abovementioned elements of embodiment 1A which is capable, by way of the link 31, of controlling the means 15 for changing over from the first position to the second position, especially includes a means 33, of the usual type, for detecting the start of the raising of at least one landing gear 50, 51 of the airplane 2 and, if appropriate, for signaling such a detection to the control unit 16B by way of a link 34, and said control unit 16B is formed in such a way as to generate a control demand making it possible to bring said lift-augmentation devices 12 and 13 from said second position to said third position, at least when said means 33 signals the start of the raising of the landing gear 50, 51.

Said control system 1B further includes a safety device 35 which comprises:

usual means 36 for determining the actual speed of the airplane 2. Said means 36 may correspond to the abovementioned means 21;

usual means 37 for selecting a second minimum datum speed of the airplane 2 for said third position of the lift-augmentation devices 12 and 13; and means for comparing said actual speed with said second minimum datum speed, said latter means comprising, for example:

a calculating means 38 linked by links 39 and 40 respectively to said means 36 and 37, for calculating the difference between said actual speed and said second minimum datum speed; and a comparison means 41 linked by a link 42 to the calculating means 38, for comparing this difference with the zero value.

As will be seen below, said safety device 35 is associated with said control unit 16B in such a way that the latter generates a control demand making it possible to bring the lift-augmentation devices 12 and 13 from said second to said third position, only when the actual speed of the airplane 2 is greater than said second minimum datum speed.

Said control system 1B further includes a means 43 for determining whether a hydraulic flow rate sufficient to retract the lift-augmentation devices 12 and 13 from the second position to the third position is available. Needless to say, if that is not the case, the change of position cannot be ordered and achieved.

Needless to say, this means 43 is only necessary when a sufficient hydraulic flow rate is not continuously available, in particular when this hydraulic energy is also used to raise the landing gears. In this latter case, said means 43 can be formed in such a way as to detect the end of the consumption of hydraulic energy by the landing gears.

The control system 1B further includes a means 44 which is intended to verify whether it is possible to bring the lift-augmentation devices 12 and 13 into a third position, that is to say a means which verifies whether the second position is not the most retracted position.

The control unit 16B comprises a normal logic AND gate (gate 45) which is linked, by way of links 34, 46, 47 and 48, to said means 33, 41, 43 and 44 respectively, as well as to the gate 28 via the link 31.

Thus the control unit 16B forwards a control demand to the actuating means 15, as illustrated by a link 49, in order to bring the lift-augmentation devices 12 and 13 from the second position to the third position, when the information output by said means 28, 33, 41, 43 and 44 is all favorable to the sending of such a control demand, that is to say when:

a) the lift-augmentation devices 12 and 13 are in the second position (gate 28);

b) the landing gears start to rise (means 33);

c) the airplane 2 is flying at a speed which is greater than said second minimum datum speed (means 41);

d) a hydraulic flow rate is available which is sufficient to achieve the change of position (means 43); and e) it is possible to bring the lift-augmentation devices 12 and 13 into a third position (means 44).

Furthermore, when the landing gears and the lift-augmentation devices each have available a distinct and separate energy source, in one particular embodiment of the invention, the control system can be such that the change from the second to the third position takes place as soon as the speed condition (relating to the safety device 35) is verified, the means 33 and 43 not intervening.

It will be noted that the information relating to the first, second and third positions of the lift-augmentation devices can be input into a computer manually by the pilot, as is already the case for information relating to decision speeds. It can also be stored in memory, the airplane often being in the same take-off configurations: action by the pilot is then restricted to activating the system.

Figure 4:
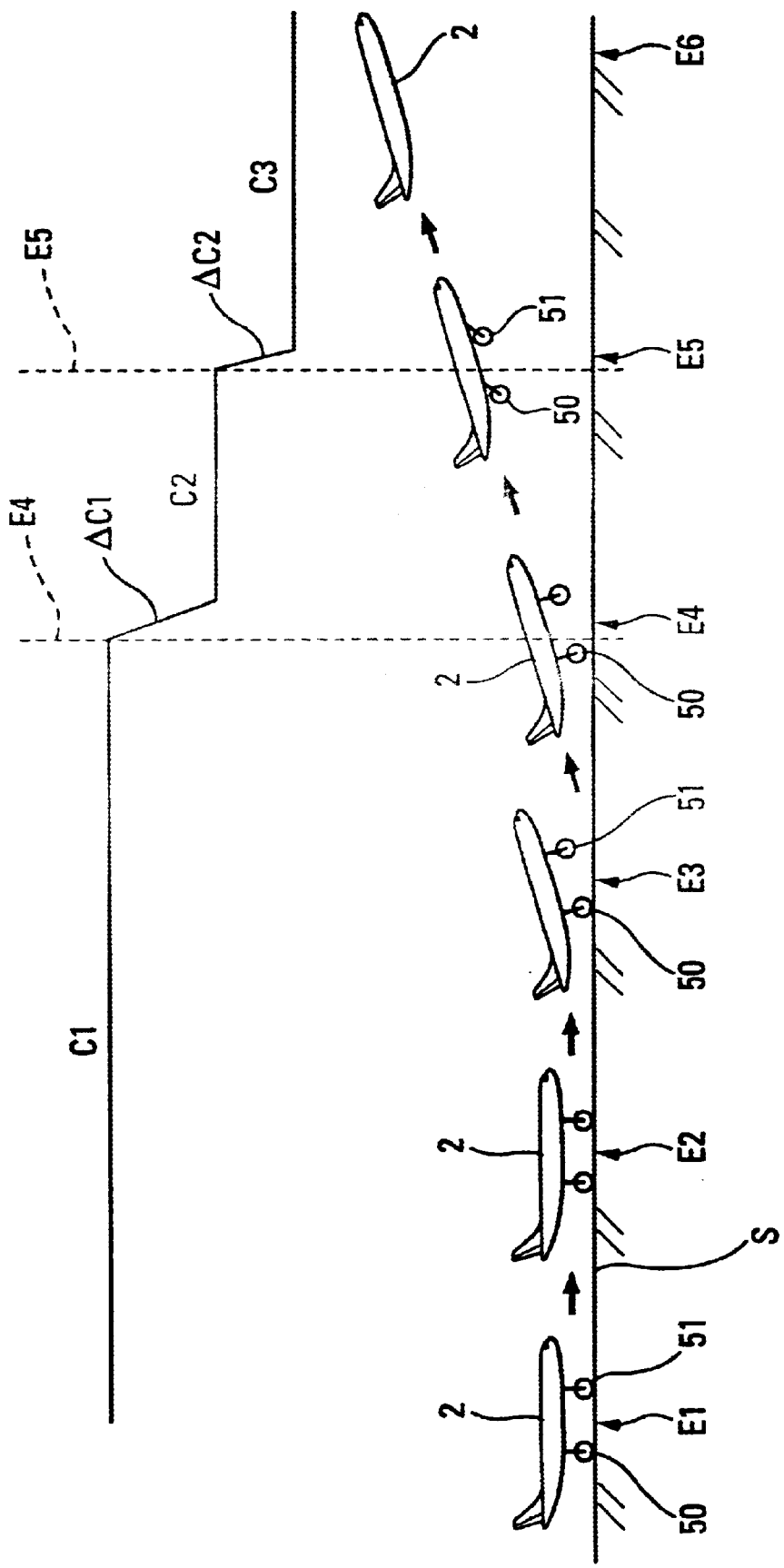
FIG. 4 is a diagram illustrating the position in accordance with the invention of the lift-augmentation devices on the basis of the various successive stages of a take-off phase.

In FIG. 4 have been represented the positions or configurations C1 to C3 of the slats 12 and of the flaps 13, on the basis of the various stages E2 to E5 of the take-off phase between standstill E1 and the phase of flight E6 subsequent to the take-off phase, which are obtained by virtue of the control system 1B represented in FIG. 3.

More precisely, these stages E1 to E6 comprise:

standstill E1, for which the speed of the airplane 2 is zero and during which the pilot activates the control system 1B and selects the first position (configuration C1) in which the lift-augmentation devices 12 and 13 are deployed;

a stage E2 of rolling along the ground S, the speed of the airplane 2 increasing progressively;

a stage E3, for which the speed is sufficient to start the rotation of the airplane 2;

the actual take-off E4 by the airplane 2. The landing gears 50 and 51 are completely relaxed (gear-unloaded indication), the main landing gear 50 leaving the ground S. At this instant, the control system 1B (logic gate 28) forwards a control demand to the means 15 for them to bring the lift-augmentation devices 12 and 13 into the second position (configuration 2). This change of position lasts a certain time $\Delta C1$;

a stage E5 corresponding to the start of the raising of the landing gears 50 and 51. At this instant, the control system 1B (logic gate 45) forwards a control demand to the means 15 for them to bring the lift-augmentation devices 12 and 13 into the third position (configuration C3). This change of position lasts a certain time $\Delta C2$; and a stage E6, at the end of the take-off phase, for which the landing gears are fully raised.

By way of illustration, on an airplane 2 on which the positions of the slats 12 and of the flaps 13 vary, in a known way, progressively from a value 0 corresponding to complete raising thereof, to values 23 and 32 corresponding to complete extraction respectively of said slats 12 and flaps 13 in such a way as to define several known configurations called "0", "1+F", "2", "3" and "Full", such that:

| Configuration | Position of the slats 12 | Position of the flaps 13 |
|---|---|---|
| "0" no lift augmentation | 0 | 0 |
| "1 + F" slight lift augmentation | 10 | 8 |
| "2" medium lift augmentation | 20 | 14 |
| "3" high lift augmentation | 23 | 22 |
| "Full" complete lift augmentation | 23 | 32 | the said first position (C1) may, for example, correspond to the configuration "3", said second position (C2) to the configuration "2" and said third position (C3) to the configuration "1+F".

What is claimed is:

1. A system for automatically controlling lift augmentation devices of an aircraft, during a phase of take-off by the aircraft, said system comprising:

controllable actuating means for shifting said lift-augmentation devices; and a control unit for generating control demands to control said actuating means to bring said lift-augmentation devices into a defined position, said control unit further including a first means for detecting actual take-off by the aircraft and, if appropriate, for signaling such detection to the control unit, and wherein, at start of the take-off phase, said lift-augmentation devices are brought into a first position, in which they are deployed, and wherein said control unit generates, at least when said first means signals the actual take-off, a control demand making it possible to bring said lift-augmentation devices into a second position, in which said lift-augmentation devices are retracted by comparison with said first position.

2. The system as claimed in claim 1, wherein said system is operable to be activated by an operator of the aircraft.

3. The system as claimed in claim 1, wherein said first means detects a landing-gear-unloaded indication.

4. The system as claimed in claim 1, further including a first safety device comprising:

means for determining the actual speed of the aircraft;

means for selecting a first minimum datum speed of the aircraft, for said second position of the lift-augmentation devices; and means for comparing said actual speed with said first minimum datum speed, and wherein said first safety device is associated with said control unit such that said control unit generates a control demand for bringing the lift-augmentation devices into said second position only when said actual speed is greater than said first minimum datum speed.

5. The system as claimed in claim 1, wherein said second position is the position of the lift-augmentation devices for cruising flight of the aircraft.

6. The system as claimed in claim 1, wherein said second position is an intermediate position between said first position and a third position, in which the lift-augmentation devices are further retracted than in said second position.

7. The system as claimed in claim 6, further including a second means for detecting start of raising of at least one landing gear of the aircraft and, if appropriate, for signaling such a detection to the control unit, and wherein said control unit generates a control demand for bringing said lift-augmentation devices from said second position to said third position, at least when said second means signals the start of the raising of the landing gear.

8. The system as claimed in claim 6, further including a second safety device comprising:

means for determining the actual speed of the aircraft;

means for selecting a second minimum datum speed of the aircraft, for said third position of the lift-augmentation devices; and means for comparing said actual speed with said second minimum datum speed, and wherein said second safety device is associated with said control unit such that said control unit generates a control demand for bringing the lift-augmentation devices into said third position only when said actual speed is greater than said second minimum datum speed.

9. The system as claimed in claim 6, further including a third means for determining whether a hydraulic flow rate which is sufficient to bring the lift-augmentation devices from the second position to the third position is available, and wherein said control unit generates a control demand in order to bring said lift-augmentation devices from said second position to said third position only when sufficient hydraulic flow rate is available.

10. The system as claimed in claim 1, further including a means for verifying whether the second position is the most retracted position.

* * * * *